United States Patent
Wagner et al.

(10) Patent No.: US 9,057,662 B2
(45) Date of Patent: Jun. 16, 2015

(54) METHOD FOR OPERATING A TIRE PRESSURE-MONITORING UNIT, AND TIRE PRESSURE-MONITORING UNIT

(71) Applicant: Huf Hülsbeck & Fürst GmbH & Co. KG, Velbert (DE)

(72) Inventors: Markus Wagner, Ludwigsburg (DE); Michael Kraft, Gondelsheim (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 14/099,951

(22) Filed: Dec. 7, 2013

(65) Prior Publication Data
US 2014/0095013 A1   Apr. 3, 2014

Related U.S. Application Data

(63) Continuation of application No. PCT/EP2012/060855, filed on Jun. 8, 2012.

(30) Foreign Application Priority Data

Jun. 9, 2011   (DE) .......................... 10 2011 050 985

(51) Int. Cl.
*G01M 17/00* (2006.01)
*B60C 23/00* (2006.01)
*E01C 23/00* (2006.01)
*G01M 17/02* (2006.01)
*B60C 23/04* (2006.01)

(52) U.S. Cl.
CPC ........... *G01M 17/02* (2013.01); *B60C 23/0406* (2013.01); *B60C 23/0454* (2013.01); *B60C 23/0455* (2013.01); *B60C 23/0457* (2013.01); *B60C 23/0459* (2013.01); *B60C 23/0474* (2013.01); *B60C 23/0484* (2013.01); *B60C 23/0488* (2013.01)

(58) Field of Classification Search
USPC .............................. 701/29.1; 340/442; 73/146
See application file for complete search history.

(56) References Cited

U.S. PATENT DOCUMENTS

| | | | | |
|---|---|---|---|---|
| 6,278,363 | B1 * | 8/2001 | Bezek et al. ................... | 340/442 |
| 6,644,108 | B2 * | 11/2003 | Inoue ................................ | 73/146 |
| 6,809,637 | B1 * | 10/2004 | Brown ........................... | 340/443 |
| 6,817,235 | B2 * | 11/2004 | Sapir ............................... | 73/146 |

(Continued)

FOREIGN PATENT DOCUMENTS

WO   2011 004229 A1   1/2011

*Primary Examiner* — Thomas G Black
*Assistant Examiner* — Tyler Paige
(74) *Attorney, Agent, or Firm* — Hackler Daghighian & Martino

(57) ABSTRACT

A method for operating a tire pressure monitoring unit for monitoring pneumatic tires of a vehicle includes where a pressure measurement is taken at regular intervals using a pressure sensor and the pressure information is transmitted wirelessly at larger intervals by a transmitter. A control unit checks whether a pressure change exceeding a threshold value has occurred, and, if so, pressure measurements are taken at shortened intervals and the transmission activity is increased. The control unit uses a first threshold value for the pressure change in the case of a stationary vehicle and uses a second threshold value, which differs from the first threshold value, for the pressure change in the case of a moving vehicle. The control unit, by evaluating a signal of an acceleration sensor of the tire pressure monitoring unit, establishes whether the first threshold value or the second threshold value is used.

17 Claims, 1 Drawing Sheet

(56) References Cited

U.S. PATENT DOCUMENTS

| | | | |
|---|---|---|---|
| 7,187,273 B2 * | 3/2007 | Rieck et al. | 340/443 |
| 7,222,523 B1 * | 5/2007 | Huang et al. | 73/146 |
| 7,392,696 B1 * | 7/2008 | Prokhorov | 73/146 |
| 8,198,993 B2 * | 6/2012 | Kessler et al. | 340/447 |

* cited by examiner

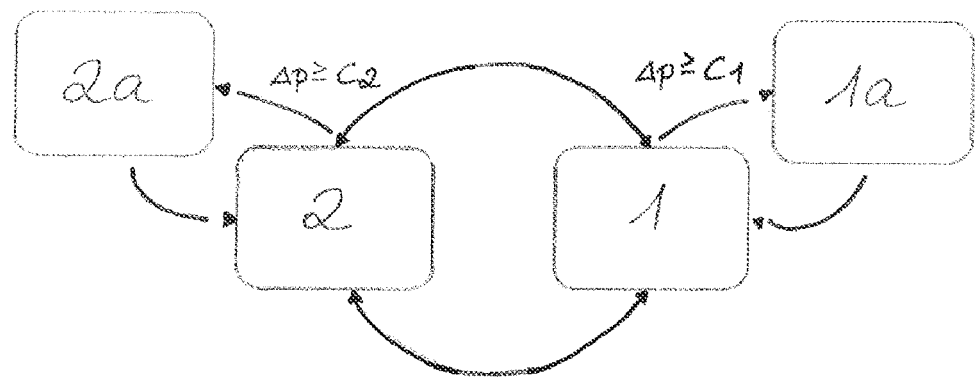

METHOD FOR OPERATING A TIRE PRESSURE-MONITORING UNIT, AND TIRE PRESSURE-MONITORING UNIT

CROSS-REFERENCE TO RELATED APPLICATIONS

This continuation application claims priority to PCT/EP2012/060855 filed on Jun. 8, 2012 which has published as WO 2012/168403 A1 and the German application 10 2011 050 985.2 filed on Jun. 9, 2011, the contents of which are fully incorporated herein with these references.

DESCRIPTION

1. Field of the Invention

The present invention generally relates to a tire pressure monitoring unit.

2. Background of the Invention

Modern tire pressure monitoring units have a number of operating modes, which differ in terms of the measurement and transmission activity. Tire pressure monitoring units typically have at least one driving mode, a parking mode and a warning mode. In the driving mode, pressure measurements are taken at first intervals, and pressure information is transmitted wirelessly at second intervals, which are greater than the first intervals. In the parking mode, the intervals between pressure measurements are extended and the transmission rate is reduced in order to minimize energy consumption. If a critical pressure change is determined, the tire pressure monitoring unit switches into a warning mode, in which pressure measurements are taken at shortened intervals and the transmission activity is increased. The warning mode ensures that, in the event of a dangerous pressure drop, pressure data is provided to a central unit of a tire pressure monitoring system with minimal time delay, so that a driver or an electronic dynamic stability control system can respond as quickly as possible to a dangerous pressure drop.

The tire pressure monitoring units of commercially available systems often have a number of driving modes, which differ in terms of the transmission activity and often also in terms of the measurement activity. For example, a first driving mode can be triggered by the start of a journey and can be replaced by a second driving mode after a predetermined period of time, for example of 10 to 20 minutes. The second driving mode is then used for tire pressure monitoring during regular driving operation, whereas the first driving mode of a central unit of the system is to enable quick assignment of characteristic identifiers of the individual tire pressure monitoring units to the various wheel positions. In the first driving mode, data telegrams are therefore sent at intervals that are shorter than in the second driving mode. The intervals between transmissions are generally much greater in the first driving mode than in the warning mode.

An object of the present invention is to specify a way in which the tire pressure monitoring can be further improved and relevant pressure data can then be provided to the driver of the vehicle when necessary, without considerably increasing the energy demand of a tire pressure monitoring unit. This object is achieved by a method having the features specified in the claims and also by a tire pressure monitoring unit according to the claims. Advantageous refinements of the invention are the matter of dependent claims.

SUMMARY OF THE INVENTION

An exemplary embodiment of a method for operating a tire pressure monitoring unit for monitoring pneumatic tires of a vehicle includes providing a pressure sensor, an acceleration sensor and a transmitter connected to a control unit, automatically taking a pressure measurement at regular intervals using the pressure sensor, automatically transmitting wirelessly the pressure measurement at larger intervals as compared to the regular intervals by the transmitter, automatically checking by the control unit whether a pressure change exceeding a first or a second threshold value has occurred, and, if so, taking and transmitting pressure measurements at shortened intervals as compared to the regular intervals, wherein the control unit is configured to utilize the first threshold value for the pressure change in the case of a stationary vehicle and utilize the second threshold value, which differs from the first threshold value, for the pressure change in the case of a moving vehicle, and automatically establishing by the control unit, by evaluating a signal of the acceleration sensor, whether the first threshold value or the second threshold value is used.

In other exemplary embodiments, the first threshold value may be smaller than the second threshold value. The first threshold value may be at least a third smaller than the second threshold value. The shortened intervals between pressure measurements may be larger when an overshooting of the first threshold value has occurred as compared to when an overshooting of the second threshold value has occurred. In the case of a stationary vehicle, the control unit may also perform the step of automatically checking whether the tire pressure has fallen below a third threshold value, and, if so, pressure measurements are taken and transmitted at the shortened intervals.

In other exemplary embodiments, in a driving mode pressure measurements may be taken at first intervals and transmitted at second intervals, where the second intervals are longer than the first intervals, and wherein in a parking mode pressure measurements may be taken at third intervals and transmitted at fourth intervals, where the third intervals are longer than the first intervals, and wherein in a parking warning mode pressure measurements may be taken at fifth intervals, and, in a driving warning mode pressure measurements may be taken at sixth intervals, where the sixth intervals are shorter than the fifth intervals. The parking warning mode may be left after a first predetermined number of pressure measurements. The control unit may be switched from the parking mode to the parking warning mode when the tire pressure has fallen below a third threshold value. The control unit may store in a memory whether a switch to the parking warning mode has already occurred due to an undershooting of the third threshold value, and the memory may be reset each time a new journey is identified by evaluation of signals of the acceleration sensor, and wherein there may be no switch to the parking warning mode when, in the memory, a value is stored which indicates that a switch to the parking warning mode due to undershooting of the third threshold value has already occurred since the last journey.

An exemplary embodiment of a tire pressure monitoring unit includes an acceleration sensor, a pressure sensor, a transmitter for wirelessly transmitting pressure information and a control unit for controlling measurement and transmission activity, the control unit in electronic communication with the acceleration sensor, the pressure sensor and the transmitter. The tire pressure monitoring unit in a driving mode takes pressure measurements at first intervals and transmits the pressure measurements at second intervals, where the second intervals are longer than the first intervals. The tire pressure monitoring unit in a parking mode takes pressure measurements at third intervals, the third intervals longer than the first intervals, and transmits the pressure measurements at fourth intervals. The control unit evaluates signals of the acceleration sensor and switches between the driving mode and the parking mode in accordance with a result of the evaluation. The control unit switches from the parking mode to a parking warning mode when a pressure change which exceeding a first stored threshold value is determined. The control unit switches from the driving mode to a driving warning mode when a pressure change exceeding a second stored threshold value is determined, where the first threshold value deviates from the second threshold value. When in the warning modes the control unit takes the pressure measurements at intervals which are shorter than the first intervals and transmits the pressure measurements at intervals which are shorter than the second intervals.

In other exemplary embodiments, in the parking warning mode pressure measurements may be taken at fifth intervals, and, in the driving warning mode, pressure measurements may be taken at sixth intervals, where the sixth intervals are shorter than the fifth intervals. The control unit may leave the parking warning mode after a first predetermined number of pressure measurements. The control unit may leave the driving warning mode after a second predetermined number of pressure measurements. The second predetermined number of pressure measurements for leaving the driving warning mode may be greater than the first predetermined number of pressure measurements for leaving the parking warning mode.

The control unit may also switch from the parking mode to the parking warning mode when the tire pressure has fallen below a third threshold value. It may be stored in a memory whether a switch to the parking warning mode has already occurred due to an undershooting of the third threshold value, and in that the memory is reset each time the control unit identifies a new journey by evaluation of signals of an acceleration sensor, and in that there is no switch to the parking warning mode when, in the memory, a value is stored which indicates that a switch to the parking warning mode due to undershooting of the third threshold value has already occurred since the last journey.

A central unit may include a receiver for receiving the wirelessly transmitted pressure information, wherein the central unit generates a warning signal when the tire pressure exceeds a predetermined tire pressure threshold value. The warning signal may be an acoustic warning signal.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 schematically illustrates various operating modes of a tire pressure monitoring unit and thus a method for operating a tire pressure monitoring unit.

DETAILED DESCRIPTION OF THE PREFERRED EMBODIMENTS

With a method according to the invention, a pressure measurement is taken at regular intervals using a pressure sensor of the tire pressure monitoring unit, and pressure information in the form of a data telegram together with an identifier identifying the transmitting tire pressure monitoring is transmitted at greater intervals by a transmitter of the tire pressure monitoring unit. The pressure measurement is checked by a control unit of the tire pressure monitoring unit as to whether a pressure change which exceeds a threshold value has occurred. If such a pressure change has occurred, pressure measurements are taken at shortened intervals, and the transmission activity is increased, that is to say the tire pressure monitoring unit switches into a warning mode. A particular feature of the method according to the invention is that the control unit uses a first threshold value for the pressure change when the vehicle is at a standstill and uses a second threshold value, which differs from the first threshold value, for the pressure change when the vehicle is moving.

With a method according to the invention, the tire pressure monitoring device can therefore switch both from a driving state and from a parking state into a warning mode, wherein, in both cases, different threshold values are used for the pressure drop necessary for this. The tire pressure monitoring can therefore advantageously be used to assist a user when filling the tires optimally. The pressure changes occurring during a filling process are generally of a magnitude comparable to that of the pressure fluctuations occurring during driving operation, which for example are caused by heating. Since a threshold value different from that for a moving vehicle is now used for a parking vehicle, the threshold value for a parking vehicle can be set so low that the pressure changes occurring when a tire is inflated reliably exceed this threshold value. Due to the then shortened intervals between pressure measurements, the tire pressure can advantageously be signaled to a user of the vehicle while the tires are being inflated. The attainment of an optimal filling pressure is preferably indicated by an acoustic signal, which for example can be triggered by a central unit, which has a receiver for receiving wirelessly transmitted pressure information of the tire pressure monitoring units. Inflating the tire to an optimal pressure is facilitated by such a tire pressure monitoring system.

To check whether a pressure change exceeds a threshold value, the difference between a current measured value and a reference value, which is based on one or more previous measured values, can be formed in the simplest case, and the value of this difference can be compared with a threshold value. The same threshold value can thus be used for pressure rises and pressure drops. However, it is also possible to use different threshold values for a pressure rise and a pressure drop. In particular, with a tire pressure monitoring device according to the invention, two different parking warning modes can be provided, wherein a first parking warning mode is triggered by a pressure rise which exceeds a threshold value, and the second parking warning mode is triggered by a pressure drop which exceeds a threshold value which preferably has a different value, or by a fall in the tire pressure below a predefined threshold. The two parking warning modes may differ for example in terms of the intervals between pressure measurements and/or the transmission of pressure information.

In the simplest case, the measured value preceding the current measured value can be used in each case as a reference value. The reference value may also be calculated from a number of earlier measured values, for example two or three earlier measured values, for example by means of averaging.

With a method according to the invention, the control unit, by evaluating signals of an acceleration sensor of the tire pressure monitoring unit, ascertains whether the first threshold value or the second threshold value is used, that is to say the control unit decides, on the basis of signals of the acceleration sensor, whether the vehicle is parked or moving.

The threshold value for a pressure change can be defined as the quotient between a pressure difference and a time interval.

The threshold value is preferably predefined however as the maximum permissible difference between a current measured pressure value and a reference value which has been determined from one or more previous pressure measurements and preferably matches the result of a previous pressure measurement.

In accordance with an advantageous refinement of the invention, the shortened intervals between pressure measurements when an overshooting of the first threshold value has triggered the shortening are greater than if an overshooting of the second threshold value has triggered the reduction. This means that, in the case of a parked vehicle, an overshooting of the threshold value causes the intervals between pressure measurements to be greater than if the second threshold value is exceeded in the case of a moving vehicle. In other words, a parking warning mode, which the tire pressure monitoring unit enters from a parking mode, differs from a driving warning mode, which the tire pressure monitoring unit enters from a driving mode, in terms of the measurement activity, specifically the frequency of pressure measurements.

In particular if the first threshold value is lower than the second threshold value, an overshooting of the second threshold value when the vehicle is moving indicates a dangerous pressure drop, which may considerably compromise the vehicle safety. In such a situation, it is advantageous if pressure measurements are taken at short intervals, for example of a second or less, and pressure information is transmitted in intervals that are just as short. In the case of a parked vehicle, an overshooting of the first threshold value by contrast does not pose an immediate risk. If a pressure loss that has occurred while the vehicle has been parked is immediately indicated to a driver when a subsequent journey is begun, or if the pumping of a tire is to be monitored, the intervals between pressure measurements may easily be greater than in a driving warning mode. The shortened intervals between pressure measurements in the case of a parked vehicle are preferably at least twice the shortened intervals in the case of a moving vehicle.

The measuring of the tire pressure at shortened intervals corresponds to a switch of the tire pressure monitoring unit into a warning mode. With a tire pressure monitoring unit according to the invention, at least two warning modes are provided, namely a parking warning mode or a plurality of parking warning modes and a driving warning mode. The intervals between pressure measurements and between the transmission of pressure information in the parking warning mode and in the driving warning mode may be the same. The intervals between pressure measurements in the parking warning mode however preferably differ from the intervals between pressure measurements in the driving warning mode.

In accordance with a further advantageous development of the invention, the intervals between pressure measurements and the intervals between the transmissions of pressure information are the same in the parking warning mode or at least in one of the parking warning modes. Likewise, it is preferable if, in the driving warning mode, the intervals between pressure measurements and the intervals between the transmissions of pressure information are the same. Each measured pressure information is then also transmitted in the parking warning mode or in the driving warning mode respectively. In contrast thereto, not every pressure measured information is transmitted in the parking mode and the driving mode. If, specifically, it is determined that the tire pressure has not changed or has only changed insignificantly, there is no need to also transmit this information. In this case, it is sufficient, for monitoring of the tire pressure, if pressure information is also transmitted only after a predetermined number of pressure measurements.

The control unit of a tire pressure monitoring unit according to the invention switches from the parking mode into the driving mode when it can be concluded from a signal of the acceleration sensor that the tire on which the tire pressure monitoring unit is mounted is turning. Conversely, the tire pressure monitoring unit switches from the driving mode into the parking mode when wheel turning can no longer be determined by evaluation of signals of the acceleration sensor.

In accordance with a further advantageous development of the invention, the control unit also transfers from the parking mode into the parking warning mode or one of the parking warning modes when the tire pressure has fallen below a third threshold value. In the case of a stationary vehicle, it is therefore also checked whether the tire pressure has fallen below a third threshold value, and, if so, pressure measurements are taken at shortened intervals and the transmission activity is increased. The third threshold value can be selected such that a tire pressure below this threshold value no longer enables safe driving. If an individual measurement provides such a result, it is advantageous if this is checked immediately by a series of pressure measurements so that a driver, when starting a subsequent journey, can immediately be provided with the information that one of the tires is flat.

The control unit preferably leaves the parking warning mode after a predetermined number of pressure measurements. If a first parking warning mode is triggered by a pressure drop and a second parking warning mode is triggered by a pressure rise, the predefined maximum numbers of pressure measurements after which the relevant parking warning mode is left again preferably differ from one another. The duration of the parking warning mode that is triggered by a pressure rise can thus be adapted to the time usually necessary to pump up a vehicle tire.

A tire pressure monitoring unit according to the invention preferably has a memory, in which it is noted whether a transfer into the parking warning mode has already occurred since the end of the last journey. This memory is preferably reset each time the control unit detects the start of a journey by evaluation of signals of an acceleration sensor, that is to say each time the tire pressure monitoring unit transfers from the parking mode into the driving mode. It is thus possible for a vehicle to transfer at most once into the parking warning mode between two journeys.

It is particularly preferred to store in the memory, which for example may be integrated into the control unit, whether a switch into the parking warning mode has occurred since the last journey due to a drop of the tire pressure below the third threshold value. In such a case, it would be determined, even after a return from the parking warning mode, that the tire is still flat. So that this information is not constantly retransmitted, a renewed transfer into the parking warning mode is preferably omitted if, in the memory, a value is stored which indicates that a transfer into the parking warning mode has already occurred since the last journey because the tire pressure has fallen below the third threshold value.

The control unit preferably leaves the driving warning mode at the earliest after a predetermined number of pressure measurements. An unnecessarily high energy consumption after the occurrence of a critical pressure change or after the undershooting of a critical threshold value can thus be avoided. Here, it is particularly preferable that the predetermined number of pressure measurements for leaving the driving warning mode is greater than the predetermined number of pressure measurements for leaving the parking warning mode, for example is at least three times greater. The monitoring process in the case of a parked vehicle can thus be designed in an energy efficient manner, and a high level of safety can be achieved in the case of a moving vehicle.

The predetermined number of pressure measurements for leaving a warning mode can be predetermined as a period of time, for example using an RC element, over which the pressure measurements are taken at regular intervals. It is also possible to predefine a number in a memory and to adapt the counter reading after each pressure measurement. In the driving warning mode, with each pressure measurement which would trigger, per se, a transfer into the driving warning mode, the predetermined number of pressure measurements can be reset again here to the original value in order to prevent premature departure of the driving warning mode. It is also possible however for the driving warning mode to always be left when the predetermined number of pressure measurements has been carried out.

A tire pressure monitoring unit has a pressure sensor for measuring the tire pressure, a transmitter for wirelessly transmitting pressure information, an acceleration sensor in order to distinguish between a turning tire and a stationary tire, and a control unit for controlling the measurement and transmission activity. The tire pressure monitoring unit may additionally comprise further sensors, for example a temperature sensor or a further acceleration sensor.

The tire pressure monitoring unit has a driving mode (1) and a parking mode (2). In the driving mode (1), pressure measurements are taken at first time intervals and pressure information is transmitted at second time intervals. In the parking mode (2), pressure measurements are taken at third intervals, which are longer than the first intervals, and pressure information is transmitted at fourth intervals, which are longer than the second intervals. It is also possible to stop transmission of pressure information in the parking mode or to transmit it only when a significant pressure change occurs or predefined pressure thresholds are overshot or undershot.

Both in the driving mode (1) and in the parking mode (2), the acceleration is also measured by the acceleration sensor. The control unit evaluates the signals of the acceleration sensor and switches between the driving mode (1) and the parking mode (2) in accordance with a result of the evaluation.

In the simplest case, the acceleration sensor may be a rotation sensor. It is also possible for a threshold value to be predetermined for trajectory and/or centrifugal acceleration. If a measured acceleration value exceeds a predetermined threshold value, it is possible to conclude that the vehicle is moving. Otherwise, the tire pressure monitoring unit starts from a parked vehicle and remains in the parking mode (2) or switches to the parking mode (2). Here, it is possible that the tire pressure monitoring unit only switches into the driving mode (1) when the travelling speed exceeds a specific threshold value, for example 10 km/h.

In the driving mode (1), an acceleration measurement is preferably also taken with each pressure measurement. In the parking mode (2), the acceleration is by contrast preferably measured more frequently than the pressure. For example, in the parking mode (2), acceleration values can be measured at intervals which are only a tenth of the intervals between pressure measurements or less, so that the start of a journey can be established as promptly as possible.

The control unit and therefore the tire pressure monitoring unit switches from the parking mode (2) into a parking warning mode (2a) if a pressure change that exceeds a first stored threshold value is determined. In the parking warning mode (2a), pressure measurements are taken at shortened intervals, specifically at a fifth interval, which are shorter than the third intervals at which pressure measurements are taken in the parking mode (2). The transmission activity is also increased in the parking warning mode (2a). This means that pressure information is transmitted at intervals which are shorter than the fourth intervals at which pressure information is transmitted in the parking mode (2), and preferably are also shorter than the second intervals at which pressure information is transmitted in the driving mode (1).

Accordingly, the control unit switches from the driving mode (1) into a driving warning mode (1a) when a pressure change which exceeds a second stored threshold value, which deviates from the first threshold value and is preferably larger than the first threshold value, is determined. It is particularly advantageous if the second threshold value is at least one and a half times as large as the first threshold value. In the illustrative embodiment illustrated, the second threshold value is twice as large as the first threshold value.

In the parking warning mode (2a) and in the driving warning mode (1a), each pressure value is preferably transmitted. This means that the intervals between pressure measurements and the establishment of pressure information are identical. The intervals between pressure measurements in the parking warning mode (2a), that is to say the fifth intervals, are larger than the intervals between pressure measurements in the driving warning mode (1a), that is to say the sixth intervals. The fifth intervals are preferably at least twice as large as the sixth intervals. In the illustrative embodiment illustrated, the fifth intervals at which pressure measurements are taken in the parking warning mode (2a) are three times as large as the sixth intervals at which pressure measurements are taken in the driving warning mode (1a). The intervals between acceleration measurements may likewise change in the event of a switch from the parking mode (2) to the parking warning mode (2a). The acceleration in the parking mode (2) is preferably measured at the same intervals as in the parking warning mode (2a).

The intervals between acceleration measurements in the parking warning mode (2a) are preferably larger than the fifth intervals between pressure measurements in the parking warning mode (2a), preferably at least twice as large. In the embodiment illustrated, the intervals between acceleration measurements in the parking warning mode (2a) are three times as large as the fifth intervals in the parking warning mode (2a).

The tire pressure monitoring unit also transfers from the parking mode (2) into the parking warning mode (2a) when the tire pressure falls below a third threshold value. The third threshold value may be 2.4 bar, for example, and is preferably selected such that the tire should be pumped up when the tire pressure falls below this threshold value.

The driving warning mode (1a) is left after a predetermined number of pressure measurements. This number is preferably selected such that the driving warning mode (1a) is left after two to five minutes. Correspondingly, the parking warning mode (2a) is also left after a predetermined number of pressure measurements. For example, the number and intervals between pressure measurements can be selected such that the parking warning mode (2a) is left after a period of time from one minute to fifteen minutes. The parking warning mode (2a) is preferably also left when the acceleration sensor delivers a signal indicating a moving vehicle.

The tire pressure monitoring unit comprises a memory, which can be integrated into the control unit and in which the various threshold values are stored. In the memory, a value may also be stored which indicates whether pressure measurements have already been taken at reduced threshold values due to the undershooting of the third threshold value. At the beginning of each journey, the memory is reset. Thus it can be achieved that a switch to the parking warning mode (2a) due to the fact that the third threshold value has been undershot can only occur once during a parking period, that is to say between the end of one journey and the start of a new journey.

The described tire pressure monitoring unit, together with a central unit comprising a receiver for receiving wirelessly transmitted pressure information, forms a system for tire pressure monitoring. The tire pressure monitoring unit is mounted in the pneumatic tire of a vehicle, for example on the rim, in particular on a valve. The central unit generates a warning signal, for example an acoustic warning signal, when the tire pressure in the parking warning mode (2a) exceeds a predefined threshold value. The inflation of the vehicle tires to an optimal pressure can thus be facilitated considerably for the driver of a vehicle. During the inflation process, a pressure change occurs which causes a transfer from the parking mode into the parking warning mode (2a). In the parking warning mode (2a), the tire pressure is then measured continuously at shortened intervals as the tire is inflated, and corresponding pressure information is transmitted to the receiver of the central unit. As soon as an optimal filling pressure is reached, this can be indicated by the central unit by means of a warning signal. The inflation of the vehicle tire can therefore be terminated once an optimal pressure has been reached.

It is particularly advantageous if two different parking warning modes are provided. A first parking warning mode can then be triggered by a pressure rise which exceeds a threshold value. This parking warning mode can be optimized to the function of a filling aid, which facilitates inflation the vehicle tire to an optimal filling pressure. The second parking warning mode can be triggered if a pressure drop exceeds a predetermined threshold value or if the tire pressure falls below a predetermined value. The two parking warning modes preferably differ in the interval between pressure measurements and/or in the number of pressure measurements after which the control unit terminates the parking warning mode in question.

Although several embodiments have been described in detail for purposes of illustration, various modifications may be made to each without departing from the scope and spirit of the invention. Accordingly, the invention is not to be limited, except as by the appended claims.

What is claimed is:

1. A method for operating a tire pressure monitoring unit for monitoring pneumatic tires of a vehicle, comprising:
   providing a pressure sensor, an acceleration sensor and a transmitter connected to a control unit;
   automatically taking a pressure measurement at regular intervals using the pressure sensor;
   automatically transmitting wirelessly the pressure measurement at larger intervals as compared to the regular intervals by the transmitter;
   automatically checking by the control unit whether a pressure change exceeding a first or a second threshold value has occurred, and, if so, taking and transmitting pressure measurements at shortened intervals as compared to the regular intervals;
   automatically utilizing by the control unit the first threshold value for the pressure change in the case of a stationary vehicle and automatically utilizing by the control unit the second threshold value for pressure change in the case of a moving vehicle, wherein the first threshold value differs from the second threshold value; and
   automatically establishing by the control unit, by evaluating a signal of the acceleration sensor, whether the first threshold value or the second threshold value is used.

2. The method according to claim 1, wherein the first threshold value is smaller than the second threshold value.

3. The method according to claim 1, wherein the first threshold value is at least a third smaller than the second threshold value.

4. The method according to claim 1, wherein the shortened intervals between pressure measurements are larger when an overshooting of the first threshold value has occurred as compared to when an overshooting of the second threshold value has occurred.

5. The method according to claim 1, wherein, in the case of the stationary vehicle, the control unit also performs the step of automatically checking whether the tire pressure has fallen below a third threshold value, and, if so, pressure measurements are taken and transmitted at the shortened intervals.

6. The method according to claim 1, wherein in a driving mode pressure measurements are taken at first intervals and transmitted at second intervals, where the second intervals are longer than the first intervals, and wherein in a parking mode pressure measurements are taken at third intervals and transmitted at fourth intervals, where the third intervals are longer than the first intervals, and wherein in a parking warning mode pressure measurements are taken at fifth intervals, and, in a driving warning mode pressure measurements are taken at sixth intervals, where the sixth intervals are shorter than the fifth intervals.

7. The method according to claim 6, wherein the parking warning mode is left after a first predetermined number of pressure measurements.

8. The method according to claim 6, wherein it is switched from the parking mode to the parking warning mode when the tire pressure has fallen below a third threshold value.

9. The method according to claim 8, wherein it is stored in a memory whether a switch to the parking warning mode has already occurred due to an undershooting of the third threshold value, and the memory is reset each time a new journey is identified by evaluation of signals of the acceleration sensor, and wherein there is no switch to the parking warning mode when, in the memory, a value is stored which indicates that a switch to the parking warning mode due to undershooting of the third threshold value has already occurred since the last journey.

10. A tire pressure monitoring unit, comprising:
    an acceleration sensor;
    a pressure sensor;
    a transmitter configured for wirelessly transmitting pressure information; and
    a control unit configured for controlling measurement and transmission activity, the control unit in electronic communication with the acceleration sensor, the pressure sensor and the transmitter;
    wherein the tire pressure monitoring unit is configured to take pressure measurements at first intervals and is configured to transmit the pressure measurements at second intervals in a driving mode, where the second intervals are longer than the first intervals;
    wherein the tire pressure monitoring unit is configured to take pressure measurements at third intervals in a parking mode, the third intervals longer than the first intervals, and is configured to transmit the pressure measurements in the parking mode at fourth intervals;
    wherein the control unit is configured to evaluate signals of the acceleration sensor and configured to switch between the driving mode and the parking mode in accordance with a result of the evaluation;

wherein the control unit is configured to switch from the parking mode to a parking warning mode when a pressure change exceeding a first stored threshold value is determined, and wherein the control unit is configured to switch from the driving mode to a driving warning mode when a pressure change exceeding a second stored threshold value is determined, where the first threshold value deviates from the second threshold value; and wherein when the control unit is configured to take the pressure measurements in the warning modes at intervals which are shorter than the first intervals and to transmit the pressure measurements at intervals which are shorter than the second intervals.

11. The tire pressure monitoring unit according to claim 10, wherein the control unit is configured to take in the parking warning mode pressure measurements at fifth intervals, and, in the driving warning mode, pressure measurements at sixth intervals, where the sixth intervals are shorter than the fifth intervals.

12. The tire pressure monitoring unit according to claim 10, wherein the control unit is configured to leave the parking warning mode after a first predetermined number of pressure measurements.

13. The tire pressure monitoring unit according to claim 12, wherein the control unit is configured to leave the driving warning mode after a second predetermined number of pressure measurements, wherein the second predetermined number of pressure measurements for leaving the driving warning mode is greater than the first predetermined number of pressure measurements for leaving the parking warning mode.

14. The tire pressure monitoring unit according to claim 10, wherein the control unit is configured to also switch from the parking mode to the parking warning mode when the tire pressure has fallen below a third threshold value.

15. The tire pressure monitoring unit according to claim 14, wherein the control unit is configured to store in a memory whether a switch to the parking warning mode has already occurred due to an undershooting of the third threshold value, and configured to reset the memory each time the control unit identifies a new journey by evaluation of signals of the acceleration sensor, and in that the control unit is configured not to switch to the parking warning mode when, in the memory, a value is stored which indicates that a switch to the parking warning mode due to undershooting of the third threshold value has already occurred since the last journey.

16. The tire pressure monitoring unit according to claim 10, including a central unit which comprises a receiver configured for receiving the wirelessly transmitted pressure information, wherein the central unit is configured to generate a warning signal when the tire pressure exceeds a predetermined tire pressure threshold value.

17. The tire pressure monitoring unit according to claim 16, wherein the warning signal comprises an acoustic warning signal.

* * * * *